Nov. 8, 1932.  W. R. SCHOFIELD, JR  1,886,430
METHOD AND SYSTEM FOR CONTROLLING REGENERATIVE FURNACES
Filed March 13, 1931  3 Sheets-Sheet 1
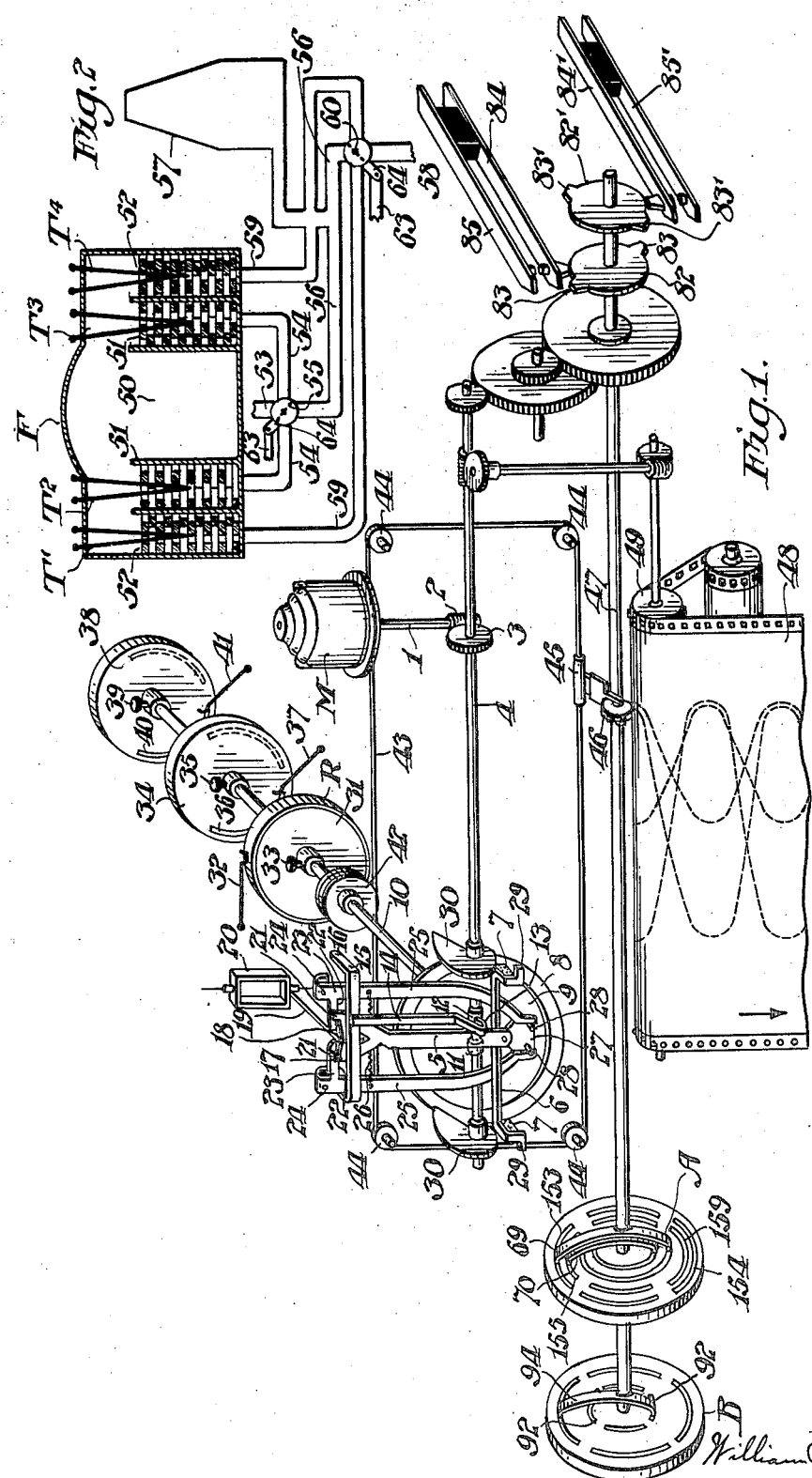

Nov. 8, 1932.  W. R. SCHOFIELD, JR  1,886,430
METHOD AND SYSTEM FOR CONTROLLING REGENERATIVE FURNACES
Filed March 13, 1931  3 Sheets-Sheet 2
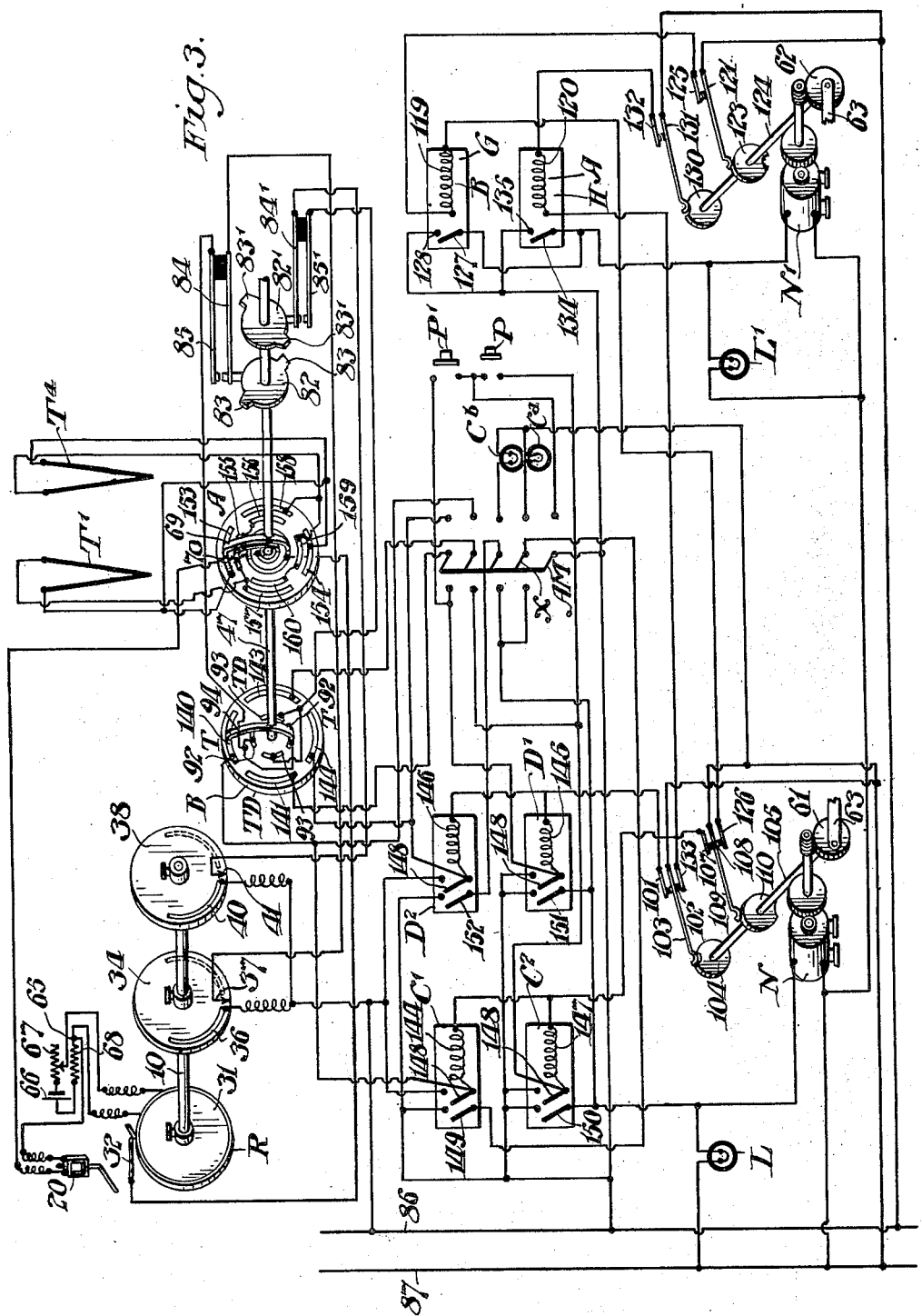
Inventor
William R. Schofield Jr.
By Cornelius D. Ehret
his Attorney Nov. 8, 1932.  W. R. SCHOFIELD, JR  1,886,430
METHOD AND SYSTEM FOR CONTROLLING REGENERATIVE FURNACES
Filed March 13, 1931   3 Sheets-Sheet 3

Inventor
William R. Schofield Jr
By Cornelius D. Ehret
his Attorney.

Patented Nov. 8, 1932

1,886,430

UNITED STATES PATENT OFFICE

WILLIAM R. SCHOFIELD, JR., OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

METHOD AND SYSTEM FOR CONTROLLING REGENERATIVE FURNACES

Application filed March 13, 1931. Serial No. 522,259.

My invention relates to a system in which upon attainment of either a predetermined difference between the magnitudes of a plurality of conditions, as thermal, electrical, mechanical, or chemical, or a predetermined magnitude of one of said conditions, a control is effected.

Specifically, my invention relates to the control of regenerative furnaces characterized by the fact that either upon attainment of predetermined difference between temperatures in different portions of the furnace or upon attainment of a predetermined temperature of one portion, the air or fuel valves, or both, are controlled to effect a change as regards the portion or region of the furnace to or through which the air, fuel, or both are supplied, or to effect reversal of action between the heating and regenerative portions of the furnace.

More particularly, the reversal may be effected automatically in response to attainment of either a predetermined difference or a predetermined magnitude, or either or both the attainment of the predetermined temperature difference or predetermined temperature indicated by signals and the reversal effected manually.

My invention resides in the methods and apparatus of the character hereinafter described and claimed.

For an understanding of my method, and for illustration of one of the various forms my apparatus may take, reference is to be had to the accompanying drawings, in which:

Fig. 1 is a perspective view of apparatus utilizable in accordance with my invention.

Fig. 2 is a sectional view of a regenerative furnace and reversing valve mechanism.

Fig. 3 is a diagram of electrical circuits and devices utilized in controlling the valves of mechanism of Fig. 2.

Figure 4:
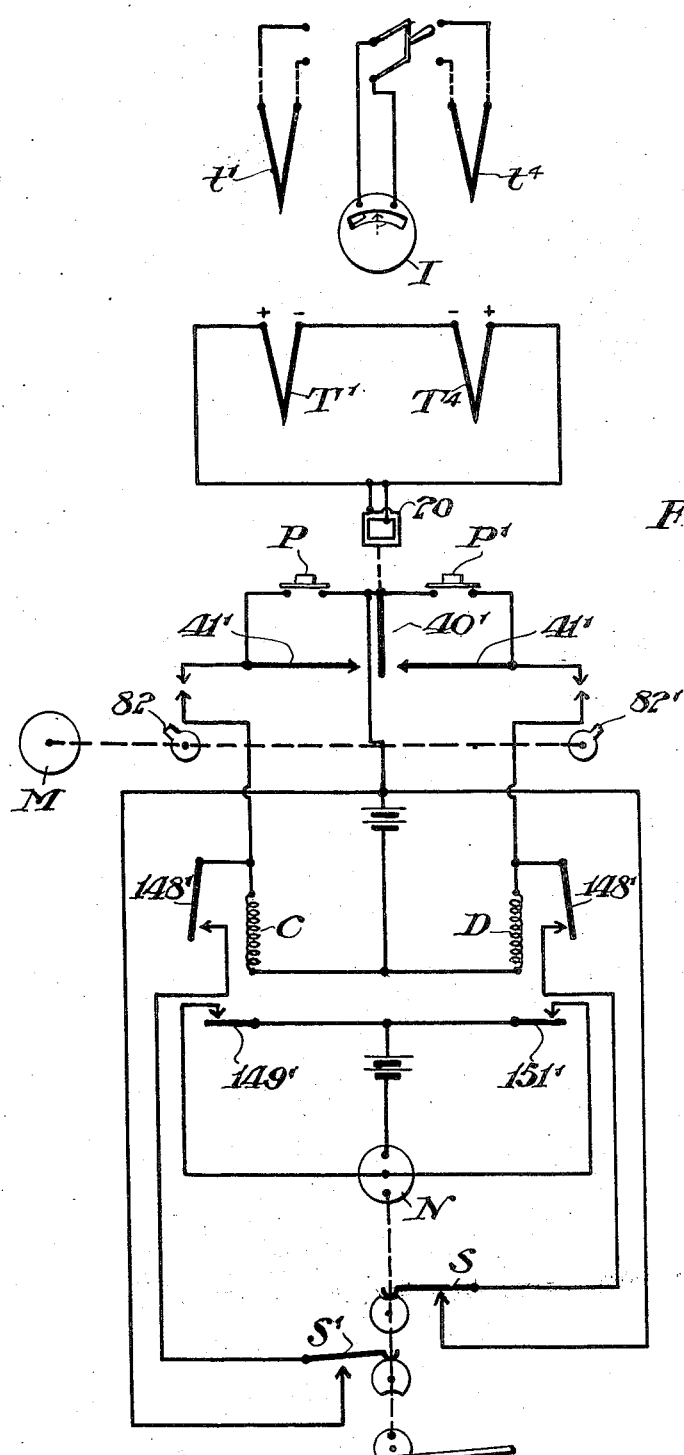
Fig. 4 is a diagram of a modified control system.

For the practice of my invention, any suitable type of measuring, indicating, or control apparatus may be utilized, particularly one controlled by a deflecting galvanometer or any other instrument, mechanical or electrical, which deflects in response to changes in a condition to be controlled. In the example illustrated in Fig. 1, the apparatus is in general similar to the mechanism of Leeds Patent 1,125,699, January 19, 1915.

The source of power M, as an electric motor, continuously rotates the shaft 1, upon which is secured the worm 2, which drives the gear 3, secured upon shaft 4. Upon the arm 5, mounted upon pivots, not shown, is pivoted the arm 6, on each end of which is carried a shoe 7, of cork or equivalent material, functionally engaging the rim 8 of clutch disk 9 secured upon the shaft 10. A cam 11, secured upon shaft 4, periodically moves the lever 5 outwardly away from disk 9 in opposition to a spring, not shown, thereby lifting the shoes 7 free from the rim 8, and after predetermined rotation of cam 11, the lever 5 is returned to normal position, bringing the shoes again into engagement with the rim 8. A second cam 12, secured upon shaft 4, actuates the end of finger 13, upon the lower end of the arm 14, when the shoes are free of the rim 8. The arm 14 is secured at its upper end to the bail member 15, pivoted at 16. Secured upon the member 15 is the element 17 whose upper edge 18 is inclined upwardly and outwardly from the center. Disposed immediately above the upper edge 18 and normally swinging free thereof, is the needle or pointer 19, of any suitable deflecting instrument, such as a galvanometer whose movable element or coil 20 deflects the member 19. The abutments 21 on member 17, limit the deflection of needle 19. Above the needle 19 are the preferably straight and horizontal edges 22 of the members 23, pivoted, respectively, at 24, beneath which the needle 19 swings freely. Members 23 extend toward each other and are separated by a gap at their inner ends of sufficient width to allow free entry of the needle 19 when in zero or balanced condition. The members 23 have the downwardly extending arms 25, biased toward each other by the spring 26. Supported at the lower end of the arm 5 and connected to the arm 6 is the plate 27 carrying the pins 28 cooperating with the lower ends of the members 25. On opposite ends of the arm 6 are the lugs 29 adapted to be engaged, when the arm 6 has been deflected from its normal horizontal position by either of the members 25, by the cams 30 secured upon the shaft 4.

As described in the aforesaid Letters Patent, when the needle 19 deflects in one direction from its immediate or zero position indicated, it is periodically clamped between the lower edge 22 of one of the members 23, under which it was deflected, and an edge 18 of the member 17, thereby deflecting the member 6 when the arm has been moved outwardly by cam 11, to an extent and in a sense corresponding with the extent and sense of deflection of the needle 19. Immediately thereafter the shoes 7 come into engagement with the rim 8 of disk 9, and thereafter one of the cams 30 engages one of the lugs 29, restoring lever 6 to its normal position indicated, and thereby carrying around with it the disk 9, the shaft 10 attached thereto, and parts mounted upon or connected to a shaft 10. Similarly, deflection of needle 19 in opposite direction effects movement of shaft 10 in opposite direction, and to an extent corresponding to an extent of deflection of the needle 19. Secured upon the shaft 10 is a disk 31, of insulating material, carrying upon its periphery the resistance conductor R, with which co-acts the stationary brush or contact 32. The disk 31 may be secured in any suitable angular position with respect to the shaft 10, by the set screws 33.

Secured upon the shaft 10 is a second disk 34 secured in any suitable angular position by the set screw 35, and carrying contact segment 36 with which coacts a stationary brush or contact 37. There is also secured upon shaft 10 a third disk 38, adjustably secured in desired position by the set screw 39, and carrying a contact segment 40, with which co-acts the stationary brush or contact 41.

Secured upon the shaft 10 is the pulley 42, around which is wrapped the cord 43, passing over idler pulleys 44 and secured to the carriage 45, in which is pivoted the recorder type wheel 46, bearing a suitable number of circumferentially spaced characters and rotated by the shaft 47 through suitable gearing from the shaft 4. A record sheet 48 is continuously advanced by roller 49, continuously driven by shaft 4, and the type wheel 46 is periodically depressed against the record sheet 48 by mechanism well understood in the art and not herein shown.

Referring to Fig. 2, F represents a regenerative furnace having a tank 50, in which glass or other material to be heated is contained. To either side of tank 50 is a pair of regenerative chambers 51 and 52, each containing checker brick, as well understood in the art, one chamber of each pair, as 51, being traversed by the incoming fuel, as gas, and the other chamber, as 52, being traversed by incoming air. Gas is supplied to the pipe 53, with which communicate the branch gas pipes 54, communicating with the gas chambers 51. The branch pipes 54 are brought alternately into communication with the supply pipe 53 by suitable control of the gas valve 55, which also controls communication between the branch pipes 54 and the flue 56 permanently in communication with the stack or chimney 57. Air is supplied, preferably under pressure, through the air supply pipe 58, with which communicate the branch air pipes 59, the valve 60 serving to control admission of air to one or the other of the air chambers. Valve 60 also controls communication between the branch pipes 59 and flue 56.

In the position of the valves 55 and 60 indicated, gas is delivered to the right-hand gas chamber 51, and air is delivered to the right-hand air chamber 52, while the pipes 54 and 59 communicating with the left-hand gas and air chambers 51 and 52 are in communication with the stack 57. Upon reversal of position of the valves 55 and 60, gas and air are delivered to the left-hand gas and air chambers 51 and 52, and the pipes 54 and 59 connected with the right-hand gas and air chambers, are connected to the stack 57.

In the operation of a regenerative furnace, it has been previously proposed to reverse the valves 55 and 60 solely upon attainment of a predetermined difference between the temperatures at different portions of the furnace, for example, when the temperature between one of the right-hand chambers differed by predetermined amount from the temperature of one of the left-hand chambers. In practical operation, this was not feasible.

If for any reason, as for example, the occurrence of an exothermic reaction in the charge, during lime boil period, for instance, the amount of heat absorbed by any one or more of the chambers is greater than the amount of heat given off to the air or fuel during regeneration, the temperature of that chamber, or chambers, does not return to its previous magnitude, and with each succeeding reversal from temperature difference only the temperature of all chambers rises to higher and higher magnitudes, and the reversal from temperature difference only is ineffective to curb this continually rising temperature which if permitted to continue would burn out and require re-building of, the checker-chambers.

Further, if in operation the furnace is not closely balanced, both sides of the furnace more or less gradually increases in temperature, eventually attaining excessively high values despite the reversal upon temperature difference.

In accordance with my invention, the valves 55 and 60 are operated either when there is a predetermined temperature difference between different portions of the furnace, regardless of actual temperatures, or when one of these portions attains a predetermined high or low temperature, regardless of temperature difference.

Consequently, if the temperatures of the chambers increase, for example, though the difference between them is maintained constant, the increase is checked when the temperature reaches a predetermined high value. The composite control not only prevents the temperature difference between the chambers from exceeding a predetermined magnitude, but insures that the difference is not at temperatures which are too high, and tend to become increasingly higher.

For operation of the valves 55 and 60, I provide any suitable motive devices, such as electric motors N and N1, Fig. 3, which when energized drive, through suitable gearing, the wheels 61 and 62 respectively, to each of which is pivoted a connecting rod 63 pivoted in turn to the valve operating arm or lever 64. Notwithstanding rotation of the wheels 61 and 62 always in the same direction, the valve operating arms or levers 64 are moved in opposite directions to effect reversals of the valves 55 and 60. It will be understood, however, that reversible motors may be employed, as well understood in the art of control, by electrical motors, for effecting reversals of the valves 55 and 60.

Suitably positioned to be subjected or responsive to the temperatures in the air or gas regenerative chambers are the thermo couples or equivalent temperature responsive devices, T1, T2, T3, and T4, (Fig. 2) which are brought into a measuring circuit of any suitable type, as in series with the galvanometer coil 30 (Fig. 3) in a branch or circuit connected to the points 32, and 65 of a potentiometer circuit, including the source of current or battery 66, adjustable resistance 67, the aforesaid resistance R and resistance 68.

The switch A is of a character effecting the connection of two thermo couples, as T1 and T4, in succession with the galvanometer coil 20, and alternatively connecting them in series with each other and in such relation that the electro motive forces oppose each other. For this purpose the negative terminal of the couple T1 is connected to the diametrically opposed switch sectors 153 and 154, while its positive terminal is connected to the two neighboring switch sectors 155 and 156 and to the sector 157 of the outer circumferentially spaced series. The positive terminal of couple T4 is conected with sectors 158, 159 and 160, while the negative terminal of the couple is connected to the negative terminal of the couple T1. In the position of the switch A indicated in Fig. 3, couple T1 alone is in circuit with the galvanometer coil 20 for the purpose of measuring the temperature to which that couple is subjected. When the switch contacts 69 and 70 are in engagement with the contacts 157 and 160, the two couples T1 and T4 are in series with each other, but opposed, whereby there is impressed upon the circuit of galvanometer coil 20 an electro-motive force which is the difference between the electromotive forces developed by the thermo-couples and representative of the difference in temperature of the two chambers in which the couples are disposed. In the next position of contacts 69 and 70, when they are in engagement with contacts 154 and 159, the couple T4 alone is in circuit and the temperature to which it is subjected is measured. And in the fourth position of the contacts 69 and 70 in engagement with contacts 158 and 156, the couples T1 and T4 are again in series with each other, and opposed, but their sense of connection in the galvanometer coil circuit is relatively reversed. The type wheel 46, Fig. 1, under these circumstances, produces four records, two for the thermo couples T1 and T4, when separately in circuit and two further records when they are in circuit and opposed to each other.

Secured upon the shaft 47, Fig. 1, is a cam 82, having the two high points 83 for moving the contact 84 into engagement with contact 85 for a short time just as the outer ends of the brushes 69 and 70 are leaving contacts 153, 155 or 154 and 159 of switch A. The brush 37 is connected to contact 84, and the cooperating contact 85 is connected to the diametrically opposite contact sectors 92, 92 of the relay selecting switch B comprising the brush 94 insulated from and rotated by the shaft 47.

When the brush 37 engages the contact 36 of disk 34 and the contacts 84 and 85 are closed by cam point 83, and with the contact brush 94 connecting the sectors 92 and 140 of the relay selector switch B, the changeover switch AM being thrown to the left for automatic operation, the winding 144 of the relay C1 is energized, through the contacts 107 and 108 of a limit switch having an arm 109 engaging a cam 110 driven by motor N. Upon energization of the winding, the contact 148 seals in the relay so that it remains energized regardless of the circuit position of any of the contacts above, except the limit switch contacts 107 and 108. The relay remains energized therefore, after separation of contacts 84 and 85. Upon energization of the relay winding, the contact 149 is moved to closed circuit position, simultaneously completing through blade X of the switch AM, the circuit of motor N, and signal light L. Upon energization, the motor N drives the shaft 105 on which are mounted the cams 104 and 110 through the reduction gearing indicated, until the shaft has rotated through 180 degrees, whereupon contacts 107 and 108 are separated, de-energizing the relay winding 144 to stop the motor N and extinguish the signal light L.

The contact 108 of the limit switch operated by cam 110 at the completion of this movement engages the contact 126 to complete a circuit through the winding 119 of relay G, and the limit switch contacts 121 and 125 which are operable by cam 123 driven by the motor N1. Upon energization of relay G the movable contact 127 is moved into engagement with a fixed contact 128 of the relay G, simultaneously to complete the circuit of motor N1 and signal light L1. Upon energization, the motor N1 rotates the shaft 124 through 180 degrees to reverse the air valve 60. At the end of this movement the contacts 121 and 125 are separated by the cam 123 to de-energize relay 119 whereupon the motor N1 is stopped and the signal light L1 extinguished.

Similarly, if the brush 37 engages the contact 36 when the brush 94 of the relay selector switch B is connecting the sectors 92 and 144, the winding 146 of relay D2 is completed through contacts 101 and 102 of the limit switch 103 operated by cam 104 mounted upon shaft 105 and driven by motor N. Upon energization of the relay, the contact 148 is made to complete a seal-in circuit for the relay. Simultaneously, the contact 152 is moved to closed circuit position, simultaneously to complete through the switch AM the circuits of the motor N and signal light L. When the motor has rotated shaft 105 through 180 degrees to again change the position of the gas valve 55, contacts 101 and 102 of the limit switch are separted to de-energize the relay 146 and thereby open the circuit of the motor N and the signal light L. At the same time, the contact 102 engages the contact 133 to energize the winding 120 of the relay H through the contacts 131 and 132 of the limit switch operated by cam 130 driven from motor N1.

Upon energization of relay H, the contact 134 is attracted to engage the fixed contact 135 completing the circuits of the motor N1 and signal light L1.

The shaft 124 is rotated through 180 degrees by motor N1 to again change the position of the air valve 60, the contacts 131 and 132 being separated at the end of the movement by cam 130 to de-energize the relay winding 120 which effects stopping of the motor N1 and extinguishes light L1.

There is also secured to shaft 47 a cam 82', having the two high points 83', each disposed at substantially 90 degrees to the high points 83 of cam 82, for moving the contact 84' into engagement with contact 85' just as the outer ends of the brushes 69 and 70 are leaving the pair of contacts 158, 156, or contacts 157, 160. Assuming that the contacts 69 and 70 are in engagement with contacts 158 and 156, at which time the contact 94 of the relay selector switch B connects the contact 143 with contact 93, and that the predetermined temperature difference exists to effect engagement of contact 41 with segment 40 of disk 38; upon engagement of the contacts 84' and 85', the winding 147 of the relay C2 is completed through the contacts 107 and 108 of a limit switch for motor N. Upon energization the contact 148 of the relay completes a sealing-in circuit and simultaneously the contact 150 is actuated to simultaneously complete the circuit of motor N and signal light L. The motor N continues to operate until the shaft 105 rotates through 180 degrees, reversing the position of the gas valve, at which time the contacts 107 and 108 are separated to effect as above described, de-energization of motor N and energization of motor N1 through contacts 108, 126 closing relay G, which at the end of its valve actuating movement is de-energized by separation of contacts 125 and 121 in circuit with the winding 119 of relay G.

Similarly, if the predetermined temperature difference is attained, when the contact 94 of the relay selector switch B is in engagement with contact sectors 141 and 93, the brush 41 is in engagement with contact sector 40 of the disk 38 upon shaft 10, and when the contact 84' is pressed into engagement with contact 85' by cam point 83', the winding 145 of relay D1 is energized, the limit switch contacts 101 and 102 being closed. Upon energization of the relay winding a seal-in circuit is completed by contact 148 and simultaneously contact 151 is actuated to complete the circuits of motor N and signal light L. As previously described, the motor N will run until the gas valve is reversed whereupon the motor is de-energized by separation of the limit switch contacts 101 and 102 in circuit with the relay winding 145 and thereafter by engagement of the contacts 102 and 133, the winding 120 of the relay H is energized to control the motor N1 as above described, the motor being stopped at the end of the valve reversing movement by opening of the relay contacts 134 and 135 in response to deenergization of the relay winding 120 upon separation of contacts 132 and 131 of the limit switch.

In the system as above described, the position of the valves 55 and 60 is reversed either when a predetermined temperature exists between the chambers 52, or the temperature of one of these chambers attains a predetermined value and similarly, a subsequent reversal of the valves may be effected in response to either a predetermined temperature difference or a predetermined temperature. By this type of control, there is prevented any tendency for the checker chambers or sides of the furnace to attain dangerously high temperatures which is an inherent fault of a system utilizing reversal in response to temperature difference only. It will be understood that in my system the reversals may be effected in both directions by temperature difference, in both directions by predetermined temperature, or in one direction by predetermined temperature and in the other direction by predetermined temperature difference.

When the switch AM is thrown to the right, Fig. 3, the system is under manual control, that is, a suitable signal is given, as by lights, when reversal should be effected either because of attainment of predetermined temperature or of predetermined temperature difference, and upon closing of a suitable switch by an attendant, the valve reversing operation is effected, signals indicating completion of the valve reversing operations. For example, when the predetermined high temperature is attained, either of the relays C1, or D2 is energized as above described, the contacts 149, 152, however, instead of completing the circuit of the motor N, as above, actuate the signals Ca or Cb, respectively. Assuming that the signal light Ca flashes, the attendant presses the push button P which energizes the winding 147 of the relay C2, which as above described, completes the seal-in circuit and energizes the motor N, the attendant being made aware of this by operation of the signal light L. At the conclusion of the valve reversing operation of motor N the winding of the relay 147 is broken by the limit switch contacts 107, 198. Then, as above described, by engagement of the limit switch contacts 108 and 126, the motor N' is energized through relay G, the attendant being made aware of this by the lighting of the signal L1. At the conclusion of the reversal the light L1 is extinguished simultaneously with de-energization of the motor N1.

Similarly, if a predetermined high temperature is attained with the gas flowing in the opposite direction, the relay D2 is energized to operate the signal light Cb, whereupon the attendant presses the button P1 to energize the winding 145 of the relay D1. The subsequent operation of the motors N and N1 will readily be understood from the foregoing.

In like manner, if a predetermined temperature difference is attained, before the temperature of one of the checker chambers reaches a predetermined value (high or low), the brush contact 41 engages the contact sector 40 of disk 38 to effect energization of either relay C1 or D2 depending upon the position of the arm 94 of the relay selector switch, the contacts 149 or 152 of the relays operating either of the signal lights Ca or Cb, as above.

The attendant as above described, then presses a corresponding push button to effect reversal.

The operator is made aware of the time for reversal, by the lights Ca and Cb, without regard to whether their energization is in response to attainment of predetermined temperature difference or predetermined temperature, and may follow the successive valve reversing steps by observation of the lights L and L1.

Preferably, as above described, the air controlling valve shall be shifted or moved after the gas control valve is actuated if both air and fuel are regenerated and accordingly the motor N1 is under the control of motor N and is not energized until an appreciable time after energization of motor N, or until, in fact, de-energization of motor N. However, the two motors N and N1, may be simultaneously controlled and energized, in which case the motor N1 need simply be connected in parallel with the motor N, whereupon the relays G, H, switches 121, 125 and 131, 132, and contacts 126 and 133 may be omitted.

While in the above description, it has been assumed that one of the controls is determined by attainment of predetermined high temperature, it may be effected also by attainment of predetermined low temperature, in which case the contact sector 36 may be shifted to the other side of disk 34, as indicated in dotted lines.

A simplified control system which is partly automatic and partly manual, is disclosed in Fig. 4, in which the thermo-couples T1 and T4 are connected in series opposition to the coil 20 of the deflecting galvanometer or equivalent. A contact 40' upon movement of coil 20 engages one or the other of the contacts 41', 41' when a predetermined temperature difference is attained to energize one or the other of the relays C or D, which upon energization complete a seal-in circuit through relay contact 148' and a corresponding limit switch S or S1. Upon completion of the valve reversing operation effected by arm 63 driven from motor N, the relay circuit is broken, de-energizing the motor.

A temperature indicating, measuring or recording device I, is used to determine the temperature of one of the chambers, for example, a chamber at the firing end of the furnace. It may be adapted to be connected for example, alternately to the thermo-couples t1, t4, either manually or by the motor M. If the temperature indicated by the instrument I, is in excess of a desired value, an attendant operates push button P or P1 to effect manually the reversal of the valve mechanism although the temperature difference has not been attained and so prevent an unbalanced furnace system from attaining dangerously high temperatures. If both air and gas valves are used, they may be both operated from the motor N or a second motor N', connected in shunt to motor N, may be used, or as in the system of Fig. 3, the motor N may control the energization of the second motor to effect sequential operation of the valves.

Instead of operating push-buttons, an operator may directly manipulate the valve reversing mechanism.

Similarly, the valves may be directly reversed by an operator upon observance of a signal indicating the attainment of predetermined temperature; i. e. the reversal may be effected by manual operation of the valve mechanism upon observation of a signal, or signals, indicating existence of predetermined temperature difference between the chambers, or a predetermined temperature of one of them.

While in the foregoing description, the valve mechanism has been described as under the control of the couples T1 and T4, it will be understood that couples T2 and T3, T1 and T3, or T2 and T4 may be utilized for the control; and that the temperature difference may be measured between a pair of chambers 52 while the predetermined temperature may be of the chambers 51, for example, in Fig. 4, couples disposed respectively in the chambers 51, may be connected to the temperature indicating instrument I in lieu of couples $t1$, $t4$.

My invention is not limited to reversal of both fuel and air valves; for example, in furnaces using liquid fuel, in which only air is regenerated, the air valve mechanism is reversed and substantially simultaneously the proper fuel burner or burners is or are controlled to supply heat while another burner or burners is or are controlled to reduce or discontinue the supply of heat. When steam, or other vehicle, is associated with the burners for atomizing heavy fluid, as tar, the supply of steam to the boilers is also controlled.

My invention is not restricted to the preferred systems shown but is commensurate in scope with the appended claims.

What I claim is:

1. The method of controlling a regenerative furnace having regenerative chambers and valve mechanism for reversing the flow through said chambers which comprises measuring the temperature difference between said chambers, measuring the temperature of at least one of said chambers, and actuating said valve mechanism upon attainment of predetermined magnitude of either said temperature difference or said temperature.

2. The method of controlling a regenerative furnace having regenerative chambers and valve mechanism for reversing the flow through said chambers which comprises, producing an electrical potential whose magnitude is determined by the temperature of one of said chambers, producing a second electrical potential whose magnitude is determined by the difference in temperature of said chambers, and actuating said valve mechanism when either of said potentials attains a predetermined magnitude.

3. The method of controlling a regenerative furnace having regenerative chambers and valve mechanism for reversing the flow through said chambers which comprises, producing electrical potentials whose magnitudes are respectively determined by the temperatures of said chambers, opposing said potentials to produce a resultant potential whose magnitude is determined by the temperature difference of said chambers, and actuating said valve mechanism when said resultant potential or one of said first potentials attains a predetermined magnitude.

4. The method of controlling a regenerative furnace having regenerative chambers and valve mechanism for reversing the flow through said chambers which comprises, measuring the temperature difference between said chambers, measuring the temperature of one of said chambers, actuating the valve mechanism upon attainment of predetermined magnitude of either said temperature difference or of said temperature, thereafter measuring the temperature of the other of said chambers and the temperature difference between said chambers, and again actuating the valve mechanism upon attainment of either a predetermined temperature of said other of said chambers or a predetermined difference in temperature between said chambers.

5. The method of controlling a regenerative furnace having regenerative chambers and valve mechanism for reversing the flow through said chambers which comprises, measuring the temperature of one of said chambers, measuring the temperature difference between said chambers, actuating said valve mechanism in response to attainment of predetermined temperature difference or predetermined temperature of said chamber according to which is first attained, thereafter measuring the temperature of the other of said chambers and the temperature difference between said chambers, and again actuating the valve mechanism when either the temperature of said other of said chambers or the temperature difference attains a predetermined magnitude.

6. The method of controlling a regenerative furnace having regenerative chambers and valve mechanism for reversing the flow through said chambers which comprises, producing an electrical potential whose magnitude is determined by the temperature of one of said chambers, producing a second electrical potential whose magnitude is determined by the difference between the temperatures of said chambers, actuating said valve mechanism when either of said potentials attains a predetermined magnitude, thereafter producing a third electrical potential whose magnitude is determined by the other of said chambers, and again actuating said valve mechanism when either said second potential or said third potential attains a predetermined magnitude.

7. The method of controlling a regenerative furnace having regenerative chambers and valve mechanism for reversing the flow through said chambers which comprises, producing electrical potentials whose magnitudes are respectively determined by the temperatures of said chambers, opposing said potentials to produce a resultant electrical potential whose magnitude is determined by the temperature difference of said chambers, actuating said valve mechanism when said resultant potential or one of said first potentials attains a predetermined magnitude, and again actuating said valve mechanism when the other of said first potentials or said resultant potential, attains a predetermined magnitude.

8. The method of controlling a regenerative furnace having regenerative chambers and valve mechanism for reversing the flow through said chambers which comprises, measuring the temperatures of said chambers, measuring the temperature difference of said chambers, and actuating said valve mechanism whenever a predetermined temperature difference is attained or when the temperature of one of said chambers attains a predetermined high magnitude.

9. The method of controlling a regenerative furnace having regenerative chambers and valve mechanism for reversing the flow through said chambers which comprises, measuring the temperatures of said chambers, measuring the temperature difference of said chambers, and actuating said valve mechanism whenever a predetermined temperature difference is attained or when the temperature of one of said chambers attains a predetermined low magnitude.

10. The method of controlling a regenerative furnace having regenerative chambers and valve mechanism for transferring, respectively, the fuel and air from one pair of said chambers to another pair which comprises measuring the temperature of at least one of said chambers and the difference in temperature between chambers of different pairs, and effecting actuation of the fuel and air valves upon attainment of a predetermined magnitude of either said temperature difference or said temperature.

11. The method of controlling a regenerative furnace having regenerative chambers and valve mechanism for transferring, respectively, the fuel and air from one pair of said chambers to another pair which comprises measuring the temperature of and the temperature difference between chambers of different pairs, effecting actuation of the fuel and air valves upon attainment of a predetermined magnitude of the temperature difference between said chambers of different pairs or the temperature of one of them, and reversing the fuel and air valves upon attainment of a predetermined magnitude of the temperature of another of said chambers or of the temperature difference.

12. The method of controlling a regenerative furnace having regenerative chambers and valve mechanism for reversing the flow through said chambers which comprises measuring the temperature difference between said chambers and the temperature of at least one of them, producing a signal in response to attainment of a predetermined temperature difference or a predetermined temperature, and thereafter actuating said valve mechanism.

13. The method of controlling a regenerative furnace having regenerative chambers and valve mechanism for reversing the flow through said chambers which comprises measuring the temperature difference between said chambers and the temperature of at least one of them, producing a signal in response to attainment of a predetermined temperature difference or a predetermined high temperature, and thereafter actuating said valve mechanism.

14. The method of controlling a regenerative furnace having regenerative chambers and valve mechanism for reversing the flow through said chambers which comprises measuring the temperature difference between said chambers and the temperature of at least one of them, producing a signal in response to attainment of a predetermined temperature difference or a predetermined low temperature, and thereafter actuating said valve mechanism.

15. The method of controlling a regenerative furnace having regenerative chambers and valve mechanisms for transferring, respectively, the fuel and air from one pair of chambers to another pair which comprises, producing a signal in response to attainment of a predetermined temperature difference between chambers or a predetermined temperature of one of them, and thereafter effecting actuation of said fuel and air valves to transfer fuel and air from one pair of said chambers to another pair of said chambers.

16. The method of controlling a regenerative furnace having regenerative chambers and valve mechanisms for transferring, respectively, the fuel and air from one pair of chambers to another pair which comprises producing a signal in response to attainment of a predetermined temperature difference between chambers or a predetermined temperature of one of them, effecting actuation of said fuel and air valves thereafter producing a signal in response to attainment of a predetermined temperature of another of said chambers or a predetermined temperature difference, and thereafter reversing said valve mechanism.

17. A control system for a regenerative furnace comprising means for determining the temperature of at least one of the regenerative chambers, means for determining the temperature difference between said chambers, valve mechanism for reversing the flow through said chambers, and means for actuating said valve mechanism when either the temperature difference or the temperature of said one of said chambers attains a predetermined magnitude.

18. A control system for a regenerative furnace comprising means for determining the temperature of at least one of the regenerative chambers, means for determining the temperature difference between said chambers, valve mechanism for reversing the flow through said chambers, and means responsive to said temperature determining means for actuating said valve mechanism when either the temperature difference or the temperature of said one of said chambers attains a predetermined magnitude.

19. A control system for a regenerative furnace comprising means for determining the temperature of at least one of the regenerative chambers, means for determining the temperature difference between said chambers, signal means operated when either the temperature difference or the temperature of said one of said chambers attains a predetermined magnitude, and valve mechanism for reversing the flow through said chambers operable upon indication by said signal means.

20. A control system for a regenerative furnace comprising valve mechanism for reversing the flow through the regenerative chambers of said furnace, manual control means for said valve mechanism, automatic control means for said valve mechanism, means for measuring the temperature difference between said chambers and the temperature of at least one of them, and means for associating said measuring means with either said automatic control means or said manual control means for actuation of said valve mechanism upon attainment of either a predetermined temperature difference or a predetermined temperature.

21. A control system for a regenerative furnace comprising valve mechanism for reversing the flow through regenerative chambers of said furnace, a motor therefor, electrical devices responsive to the temperatures of said chambers, a measuring device having control contacts, a plurality of relays for individually controlling said motor, and switching mechanism for connecting said electrical devices alternately individually and differentially in circuit with said measuring device and simultaneously connecting said relays alternately in circuit with said control contacts whereby said motor is energized to actuate said valve mechanism when either the temperature of one of said chambers or the temperature difference between two of them attain a predetermined magnitude.

22. A control system comprising a plurality of temperature-responsive devices subject respectively to the temperature in different regions, means controlling increase in application of heat in one of said regions and preventing application of heat in another of said regions, and mechanism controlling said means and controllable by said temperature-responsive devices alternately individually and jointly.

23. A control system comprising a plurality of temperature-responsive devices subject respectively to the temperature in different regions, means controlling increase in application of heat in one of said regions and preventing application of heat in another of said regions, and mechanism controlling said means and controllable by said temperature-responsive devices alternately individually and differentially.

24. A control system for a regenerative furnace comprising valve mechanism for reversing the flow through regenerative chambers of said furnace, temperature responsive devices subjected respectively to temperatures in different chambers, and means for controlling said valve mechanism controlled by said temperature responsive devices alternately differentially and individually to effect actuation of said valve mechanism upon attainment of a predetermined temperature difference or a predetermined temperature.

25. A control system for a regenerative furnace comprising valve mechanism for reversing the flow through regenerative chambers of said furnace, temperature responsive devices subjected respectively to temperatures of different chambers, signal means controlled by said temperature responsive devices alternately individually and jointly, means for operating said valve mechanism actuable upon indication by said signal means, and second signal means controlled by actuation of said operating means.

26. A control system for a regenerative furnace comprising valve mechanism for reversing the flow through regenerative chambers of said furnace, temperature-responsive devices subjected respectively to temperatures of different chambers, signal means controlled by said temperature responsive devices alternately individually and differentially, means for operating said valve mechanism actuatable upon indication by said signal means, and second signal means controlled by actuation of said operating means.

WILLIAM R. SCHOFIELD, Jr.